INVENTOR
N. F. Pedersen

ATTORNEYS

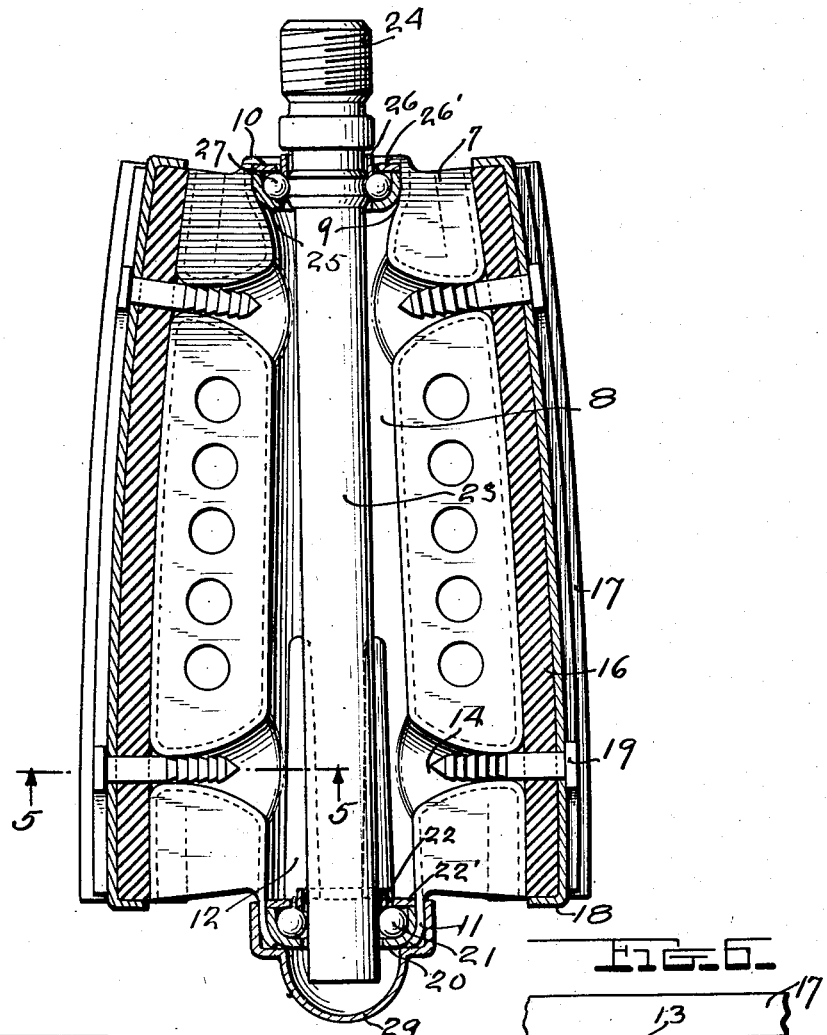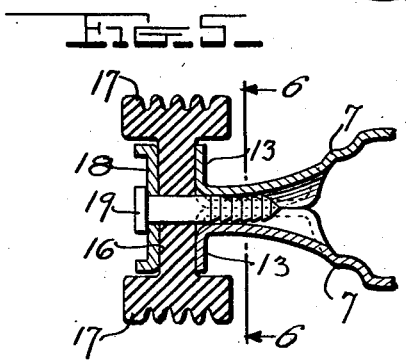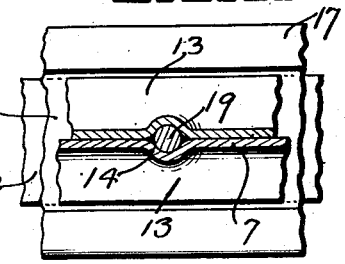

United States Patent Office 2,822,703
Patented Feb. 11, 1958

2,822,703

PEDALS FOR BICYCLES AND THE LIKE

Nicholas F. Pedersen, Torrington, Conn., assignor to The Torrington Company, Torrington, Conn., a corporation of Maine Application August 24, 1955, Serial No. 530,344

5 Claims. (Cl. 74—594.4)

The description which follows relates to a novel improvement in pedals for bicycles and the like peculiarly adapted for the comfort and efficiency of the operator.

Bicycle pedals have uniformly been made with generally rectangular treads. In other words, the tread of a pedal is usually as wide across the inner end as across the outer end. This does not take into consideration the fact that the bicyclist does not normally extend his toes directly forward. On the contrary the natural position is to spread the toes slightly apart both in walking and in pedaling. As a consequence the ordinary rectangular tread of the bicycle does not conform to the position of the foot. It establishes an engagement on the inner side of the foot before the outer side of the foot bears on the pedal. This results in a slight rolling movement or adaptation by the cyclist whenever he presses down on the pedal. The only alternative is to hold the foot in a straight forward position at all times with consequent strain on the muscles.

It is a prime purpose of my invention to provide a bicycle pedal which is narrower across the inner end than the outer end so that the cyclist's foot will engage it uniformly across the pedal and permit an easy outward push.

A further object of the invention is to provide a pedal in which the pressure from the foot will be applied simultaneously over its full width and permit the foot to assume a natural position with the front of the feet slightly spread.

A still further object of the invention is to form a pedal in which the anti-friction bearings are held in place on the shaft in proper positions by the special construction of the frame parts of the pedal.

Among the objects of my invention is to provide a pedal from sheet metal stock suitably formed to provide appropriate recesses in which to hold the ball bearing assemblies and to facilitate attachment of the tread members of rubber or similar material.

Figure 1:
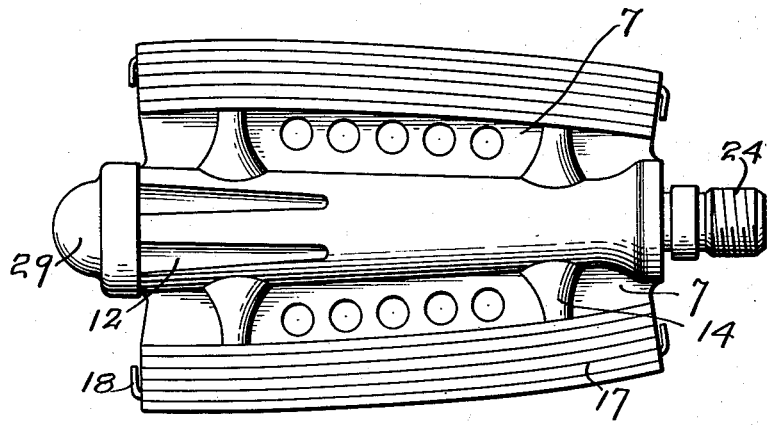
Figure 2:
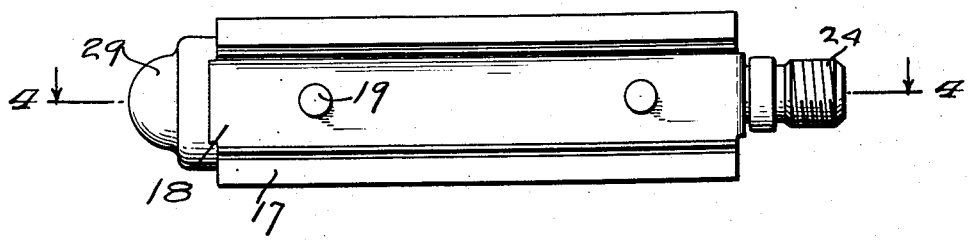
Figure 3:
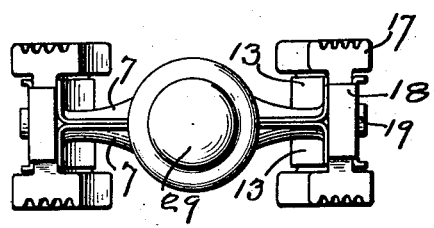

Other objects of my invention will be apparent from the following description of the preferred form of the invention as illustrated in the accompanying drawings in which:

Fig. 1 is a plan view of my improved bicycle pedal;
Fig. 2 is a side elevation;
Fig. 3 is an outer end elevation;
Fig. 4 is a horizontal cross-section on the line 4—4 of Fig. 2;
Fig. 5 is a vertical transverse cross-section on the line 5—5 of Fig. 4 and
Fig. 6 is a vertical cross-section on the line 6—6 of Fig. 5.

In brief, the invention consists in forming a pedal from an axle and specially designed cooperating parts arranged for ready assembly, permanent positioning and greater ease and convenience in use. These objects are attained by giving the pedal a properly designed form conforming to the natural position of the cyclist's foot. Further, the mode of assembly is such as to facilitate the rapid assembly of the parts into their permanent relationships.

By way of example I have shown the preferred form of the invention to consist of two identical sheet metal stampings 7, 7 which form a shell. These are given particular forms which will be later described. The flat surfaces of the shells are adapted to be spot-welded in face-to-face relation.

It will be apparent from Figs. 1 and 4 that she shell members are narrow across the inner end and relatively wider across the outer end. The pedal may therefore be said to be a trapezoid and to widen or flare toward the outer end.

The shell is provided with a center bore 8. This is tapered or flared outwardly in proportion to the flare of the shell itself so that the latter has connecting faces of relatively uniform width.

The center bore 8 at its inner end is enlarged to form a recess 9 in which to receive and hold a ball-bearing assembly.

The inner end of the center bore 8 has an inwardly extending lip 10. In assembly this lip extends longitudinally of the shell. However, it is used in the final assembly of parts to confine the inner ball bearing assembly, being bent inward in the operation to the position shown in Fig. 4.

The outer end of the bore 8 has a similar longitudinally extending lip 11. This is used in the assembly of the outer ball-bearing.

The center bore also has intermediate flutes near the outer end which form internal ribs 12 which are used for locating the outer ball-bearing assembly in its proper position.

Each metal stamping 6 is provided with two lateral flanges 13, 13. These flanges 13 extend away at right angles from the central plane of the pedal shown in Fig. 4. This is shown in Figs. 3 and 5.

The metal stampings 7, 7 have transversely extending off-set portions which combine to form channels 14, 14. These channels extend from the center bore 8 to the sides of the pedal shell.

Treads 15 of extruded rubber or plastic are attached against the lateral flanges 13, 13 in the manner shown in Figs. 3 and 5. These treads are in the form of an "I" in cross-section. They have a center web 16 with opposite faces 17, 17 forming the treads proper.

A sheet metal clamping plate 18 fits on the outer side of the web 16 and has holes registering with the channels 14.

A barbed nail 19 is driven through the hole in the clamping plate 18 and into the channel 14. It is there held against accidental removal by the barbs in the nail. This serves to clamp the treads in proper position.

An outer ball-bearing assembly is provided by an outer raceway 20 which fits within the center bore 8 at its outer end. The outer raceway 20 contains ball-bearings 21 and retainer 22 and dust washer 22'. The ball-bearing assembly is fitted frictionally within the outer end lip 11. It is also supported by the ends of the ribs 12 which limit the inward movement. The lip 11 is then bent in around the raceway 20 and holds the ball-bearing assembly in fixed position.

An axle 23 is provided with a screw-threaded end 24 and an intermediate raceway 25.

The parts of an inner ball-bearing assembly can be slipped over the free end of the axle 23 and assembled on the raceway 25. A retainer 26 and dust washer 26' is first passed beyond the raceway 25. Ball-bearings 27 and an outer raceway 28 are then fitted in position as shown in Fig. 4.

The free end of the axle is then passed downwardly or outwardly through the center bore 8 until it fits within the outer raceway 20 and the ball-bearing assembly of which the latter is a part.

At the same time the raceway 25 takes up its position within the recess 9.

By swaging or otherwise bending the lip 10 inwardly over the retainer 26, the axle is then permanently locked into position in the bore 8 of the pedal.

A dust cap 29 is then driven over the outer lip 11 for permanent attachment.

The above structure permits of ready assembly with a minimum of labor and time. The shell supports the treads in flaring or outwardly diverging positions. This will conform most effectively with a normal position of the cyclist's foot.

The particular arrangement of the center bore provides positive support for the outer ball-bearing in its proper position.

In like manner the positioning of the inner ball-bearing raceway 28 in the recess 9, provides proper position for the former and the whole assembly is then locked into position by the turning in of lip 10.

The use of barbed nails 19 and the clamping plate 18 serves to hold the treads in desired position.

The final assembly is a complete, convenient and serviceable pedal which gives improved service.

While the above description and drawings disclose the preferred form, numerous minor changes in proportions and materials may be made without departing from the scope of the following claims.

What I claim is:

1. A pedal having a shell with parallel top and bottom, a narrow inner end and a wider flaring outer end, an axle extending between the ends and having attaching means beyond the inner end, and tread members carried by the shell.

2. A pedal having a shell with parallel top and bottom, a narrow inner end and a wider flaring outer end, a center bore extending between the ends, an axle journaled in the bore and having attaching means beyond the inner end, and tread members carried by the shell.

3. A pedal having a shell with parallel top and bottom, a narrow inner end and a wider flaring outer end, a center bore extending between the ends, antifriction bearings in the ends of the bore, an axle journaled in the bearings and having attaching means beyond the inner end, and tread members carried by the shell.

4. A pedal having a two-part sheet metal shell with parallel top and bottom, a short inner end and a wider flaring outer end, a center bore extending between the ends, antifriction bearings in the ends of the bore portions of the shell, a lip integral with the bore at each end for fastening the bearings in place, an axle journaled in the bearings and having attaching means beyond the inner end, and tread members carried by the shell.

5. A pedal having a two-part sheet metal shell, a tapering center bore extending between the ends of the shell, a series of inwardly projecting ribs in the bore near its larger end, said bore having an enlarged recess at the smaller end, an antifriction bearing held in the wider end of the bore against said ribs, a second antifriction bearing held in the recess of the bore, an axle journaled in the bearings and having attaching means beyond the recessed end of the bore, and tread members carried by the shell.

References Cited in the file of this patent

UNITED STATES PATENTS

| | | |
|---|---|---|
| 563,959 | Grothe | July 14, 1896 |
| 579,794 | Fay | Mar. 30, 1897 |
| 637,657 | Pedersen | Nov. 21, 1899 |
| 2,567,785 | Rieger | Sept. 11, 1951 |

FOREIGN PATENTS

| | | |
|---|---|---|
| 624,048 | Great Britain | May 26, 1949 |